United States Patent
Suzuki et al.

(10) Patent No.: US 11,656,568 B2
(45) Date of Patent: May 23, 2023

(54) IMAGE FORMING APPARATUS AND IMAGE PROCESSING APPARATUS WITH MULTIPLE OPERATION MODES THAT SET FIRST AND SECOND GRADATION VALUES

(71) Applicant: CANON KABUSHIKI KAISHA, Tokyo (JP)

(72) Inventors: Ai Suzuki, Tokyo (JP); Kensuke Umeda, Kanagawa (JP); Shinsuke Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/657,158

(22) Filed: Mar. 30, 2022

(65) Prior Publication Data

US 2022/0317612 A1 Oct. 6, 2022

(30) Foreign Application Priority Data

Mar. 31, 2021 (JP) .............................. JP2021-061656

(51) Int. Cl.
*G03G 15/00* (2006.01)
*G06K 15/12* (2006.01)

(52) U.S. Cl.
CPC ......... *G03G 15/5062* (2013.01); *G06K 15/12* (2013.01); *G03G 2215/00029* (2013.01)

(58) Field of Classification Search
CPC ..... G03G 15/5062; G03G 2215/00029; G06K 15/12; G06F 3/1258; H04N 1/2338; H04N 1/407; H04N 1/4092
See application file for complete search history.

(56) References Cited

U.S. PATENT DOCUMENTS

| 8,681,378 | B2 | 3/2014 | Kakutani |
| 10,063,742 | B2 | 8/2018 | Tanaka |
| 10,999,476 | B2 * | 5/2021 | Tanaka .................. H04N 1/6027 |

(Continued)

FOREIGN PATENT DOCUMENTS

| EP | 3851918 A2 | 7/2021 |
| JP | 3596903 B | 12/2004 |

(Continued)

OTHER PUBLICATIONS

Partial European Search Report issued in European Patent Application No. 22163157.5 (16 pages), dated Aug. 30, 2022.

*Primary Examiner* — Roy Y Yi
(74) *Attorney, Agent, or Firm* — Venable LLP

(57) ABSTRACT

An image forming apparatus includes a setting unit configured to set an operation mode, and a processing unit configured to perform image processing on image data according to the operation mode. In a case when a first mode is set, the image processing includes determining, in the image data, one or more target pixels having a gradation value equal to or higher than a first threshold value, and one or more adjacent pixels that are different from the one or more target pixels and adjacent to the one or more target pixels, setting a first gradation value lower than the first threshold value as a gradation value of the one or more target pixels, and setting a second gradation value higher than the first gradation value as a gradation value of the one or more adjacent pixels.

19 Claims, 15 Drawing Sheets

(56) References Cited

U.S. PATENT DOCUMENTS

| | | | |
|---|---|---|---|
| 2003/0151773 A1* | 8/2003 | Ogawa | H04N 1/40087 |
| | | | 358/3.26 |
| 2012/0300263 A1 | 11/2012 | Kasai | |
| 2017/0057253 A1 | 3/2017 | Nagasawa | |
| 2018/0124285 A1 | 5/2018 | Eguchi | |

FOREIGN PATENT DOCUMENTS

| | | | |
|---|---|---|---|
| JP | 2012-204968 A | 10/2012 | |
| JP | 2015-142184 A | 8/2015 | |
| JP | 2016-039436 A | 3/2016 | |
| JP | 6248907 B | 12/2017 | |

* cited by examiner

NORMAL MODE          ARCHIVE MODE

F I G. 10

| | | UNFIXED TONER IMAGE | FIXED TONER IMAGE | | WEAR TEST RESULT |
|---|---|---|---|---|---|
| | | HEIGHT(μm) | HEIGHT(μm) | AREA (mm²) | |
| ARCHIVE MODE | FIRST EMBODIMENT | 1.5 | 6.2 | 2.3 | GOOD |
| | SECOND EMBODIMENT | 1.5 | 6.7 | 1.5 | MARGINAL |
| NORMAL MODE | | 2.5 | 9.1 | 1.7 | POOR |

F I G. 12
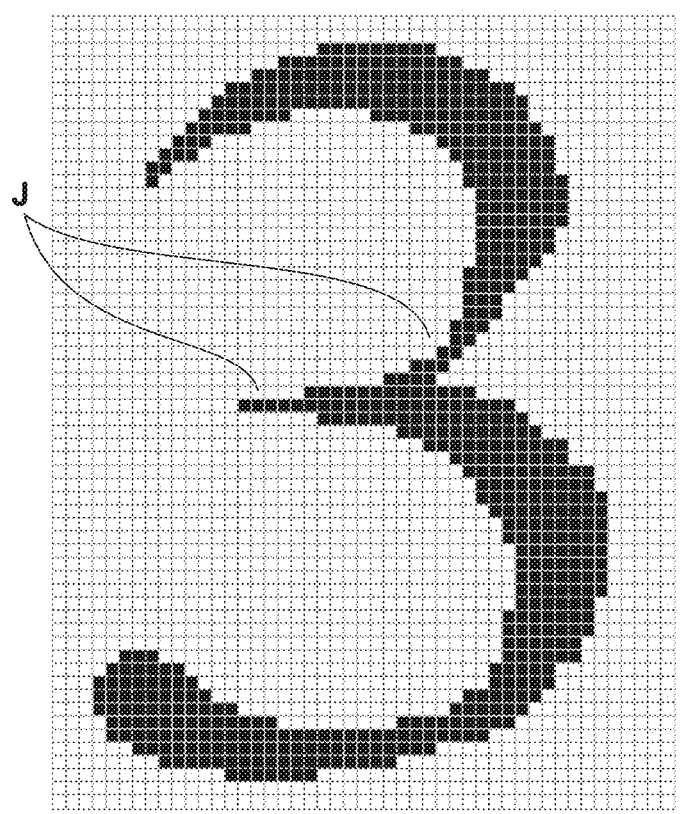

IMAGE FORMING APPARATUS AND IMAGE PROCESSING APPARATUS WITH MULTIPLE OPERATION MODES THAT SET FIRST AND SECOND GRADATION VALUES

CROSS-REFERENCE TO RELATED APPLICATIONS

This application claims the benefit of Japanese Patent Application No. 2021-061656, filed on Mar. 31, 2021, which is hereby incorporated by reference herein in its entirety.

BACKGROUND OF THE INVENTION

Field of the Invention

The present invention relates to an image forming apparatus such as a copying machine, a laser beam printer, an LED printer, or the like.

Description of the Related Art

An electrophotographic image forming apparatus performs image processing on image data in order to maintain quality of images to be formed. Japanese Patent No. 3596903 discloses a configuration for correcting gradation values of pixels corresponding to a region other than edges, among regions to which toner adheres, in order to suppress occurrence of partial image loss phenomenon. Japanese Patent No. 6248907 discloses a configuration for changing exposure pulse widths based on density detection results, in order to suppress the amount of toner consumption while maintaining the image quality.

In recent years, preservability (archivability) of products (sheets on which images are formed) of image forming apparatuses has been drawing attention. A highly preservable product refers to a product immune to significant loss in generated images due to, for example, repeated viewing or carrying. A low preservability may lead to illegible characters or the like due to image loss.

Although Japanese Patents No. 3596903 and No. 6248907 disclose image processing for maintaining the image quality of products, those documents do not disclose image processing for enhancing the preservability of products.

SUMMARY OF THE INVENTION

According to a present disclosure, an image forming apparatus includes a setting unit configured to set an operation mode among a plurality of operation modes, a processing unit configured to perform image processing on image data according to the operation mode set by the setting unit; and an image forming unit configured to form, based on the image data subjected to the image processing by the processing unit, an image on a sheet being conveyed in a conveyance direction. In a case when a first mode among the plurality of operation modes is set, the image processing by the processing unit includes determining, in the image data, one or more target pixels having a gradation value equal to or higher than a first threshold value, and one or more adjacent pixels that are different from the one or more target pixels and adjacent to the one or more target pixels, setting a first gradation value lower than the first threshold value as a gradation value of the one or more target pixels, and setting a second gradation value higher than the first gradation value as a gradation value of the one or more adjacent pixels.

Further features of the present invention will become apparent from the following description of exemplary embodiments with reference to the attached drawings.

BRIEF DESCRIPTION OF THE DRAWINGS

FIG. 10 is an explanatory diagram of an effect of an embodiment;

FIG. 12 illustrates characters used for describing image processing according to an embodiment;

DESCRIPTION OF THE EMBODIMENTS

Figure 1:
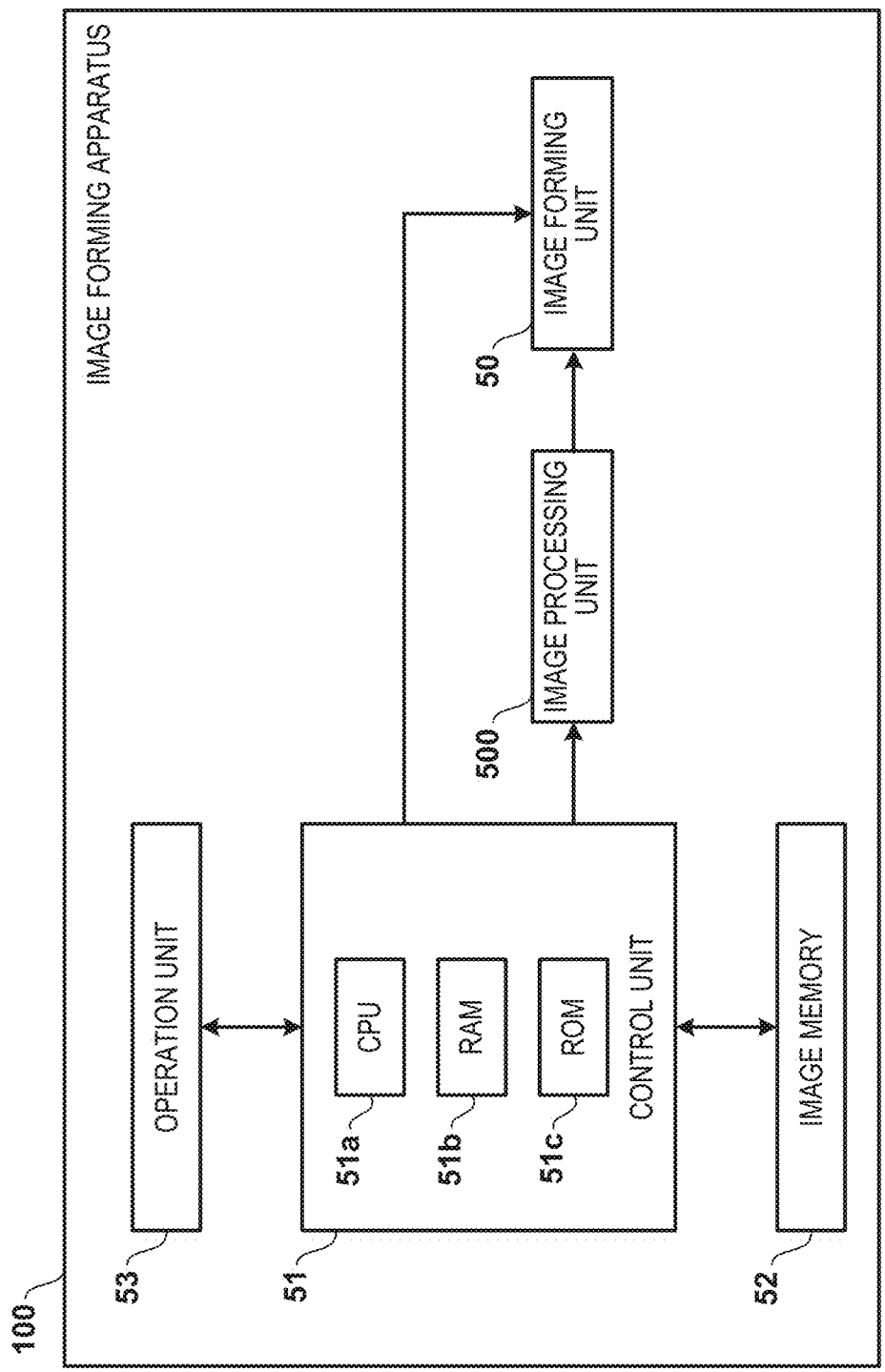
FIG. 1 is a block diagram of an image forming apparatus according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

FIG. 1 is a configuration diagram of an image forming apparatus 100 according to the present embodiment. A control unit 51 controls the image forming apparatus 100 as a whole. A processor (CPU) 51a of the control unit 51 controls the image forming apparatus 100 by executing a control program. A read only memory (ROM) 51c is holding the control program to be executed by the CPU 51a, or various parameters to be used by the CPU 51a for controlling the image forming apparatus 100. Here, other types of non-volatile memory such as a flash memory may be used in place of the ROM 51c. A random access memory (RAM) 51b, which is a volatile memory, is used for storing temporary data or the like when controlling the image forming apparatus 100.

An image memory 52 stores image data of images formed by the image forming apparatus 100. For the image memory 52, a storage apparatus such as a hard disk drive (HDD), for example, can be used. Here, the image memory 52 may be an internal apparatus of the image forming apparatus 100, or an external apparatus that communicates with the image forming apparatus 100 via a network. An operation unit 53 provides a user interface. The user can operate the image forming apparatus 100 via the operation unit 53. In addition, the user can recognize the state of the image forming apparatus 100 according to the content displayed on a display unit 53w (FIG. 2) of the operation unit 53.

Figure 2:
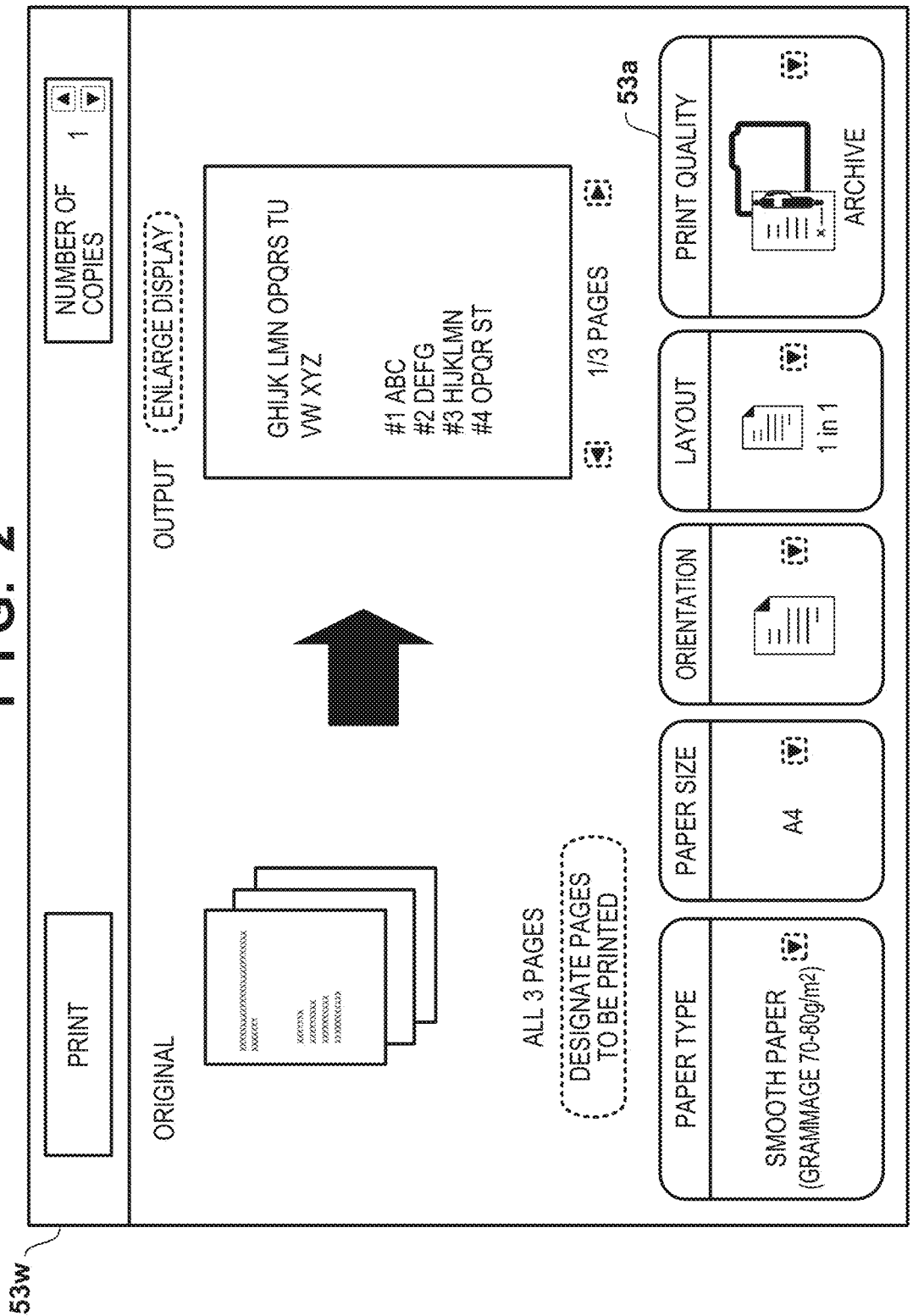
FIG. 2 illustrates an example of a screen displayed on an operation unit.

FIG. 2 illustrates an example of a screen displayed on the display unit 53w in a case when the display unit 53w is a touch panel display. The user can perform various settings related to printing (image forming) via the display unit 53w. For example, the user can set the type of sheet (paper type), sheet size (paper size), or the like. In addition, the user can set the image quality (print quality) via an icon 53a. The image quality that can be set in the present embodiment is normal quality or archive quality. Archive quality refers to image quality with a higher preservability than normal quality. Here, the image quality that can be set may include any quality other than normal quality and archive quality. In the following description, the operation mode of the image forming apparatus 100 having normal quality set therein is referred to as a normal mode, and the operation mode of the image forming apparatus 100 having archive quality set therein is referred to as an archive mode.

Returning to FIG. 1, the control unit 51 reads image data stored in the image memory 52 and outputs the image data to an image processing unit 500. The image processing unit 500 executes image processing on the image data in accordance with the operation mode, and outputs the image data subjected to image processing to the image forming unit 50. The image forming unit 50 forms an image on a sheet based on the image data subjected to image processing, and outputs a product. Here, a "sheet" refers to a medium such as printing paper on which an image is formed, and "product" refers to a sheet on which an image is formed by the image forming apparatus 100.

Figure 3:
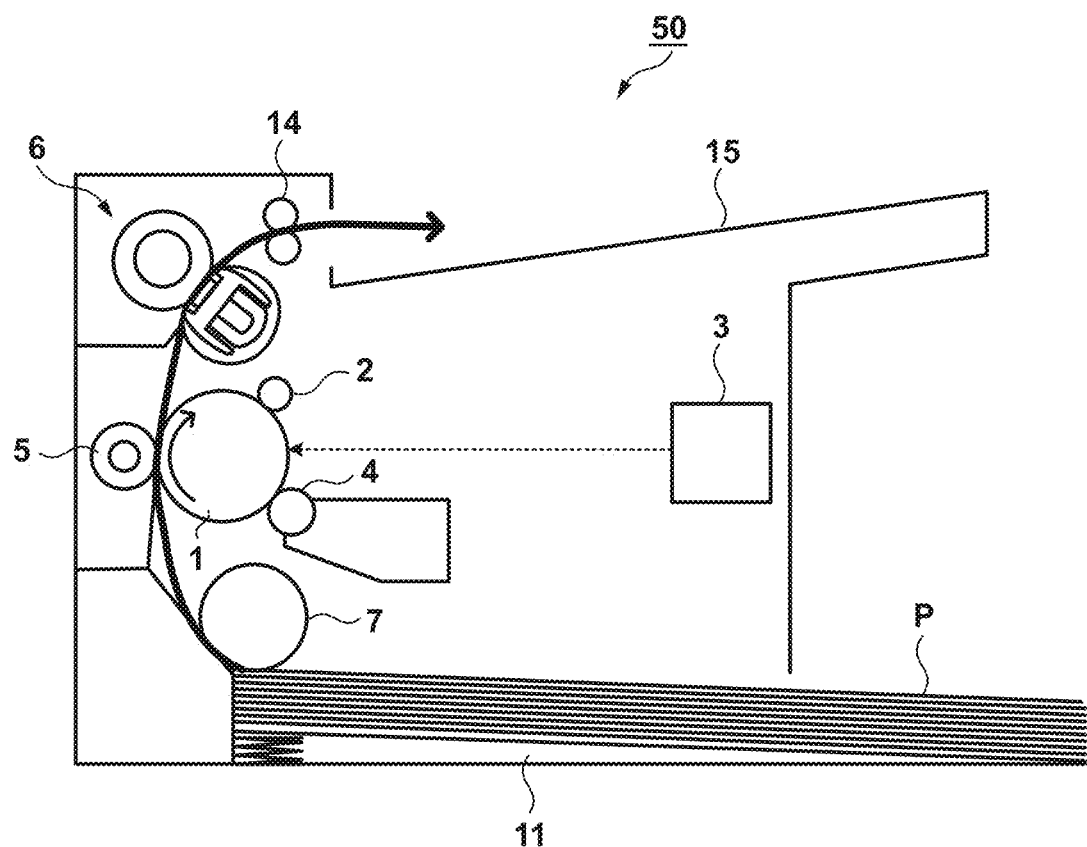
FIG. 3 is a configuration diagram of an image forming unit according to an embodiment.

FIG. 3 is a configuration diagram of the image forming unit 50. A photoconductor 1 is rotationally driven in a clockwise direction in the figure when forming an image. A charge roller 2 outputs a charging voltage to charge the surface of the photoconductor 1 to a uniform charging potential. An exposure apparatus 3 exposes the photoconductor 1 based on the input image data to form an electrostatic latent image on the photoconductor 1. A developing roller 4 of a developing apparatus outputs a developing voltage to cause toner to adhere to the electrostatic latent image on the photoconductor 1, thereby forming a toner image on the photoconductor 1. On the other hand, a sheet P stored in a cassette 11 is fed to a conveyance path by a feed roller 7, and conveyed to a position facing the photoconductor 1. A transfer roller 5 outputs a transfer voltage to transfer the toner image on the photoconductor 1 onto the sheet P. A fixing apparatus 6 heats and pressurizes the sheet P, on which the toner image is transferred, to fix the toner image on the sheet P. After having the toner image fixed thereon, the sheet P is discharged to a discharge tray 15 by a discharge roller 14.

Figure 4:
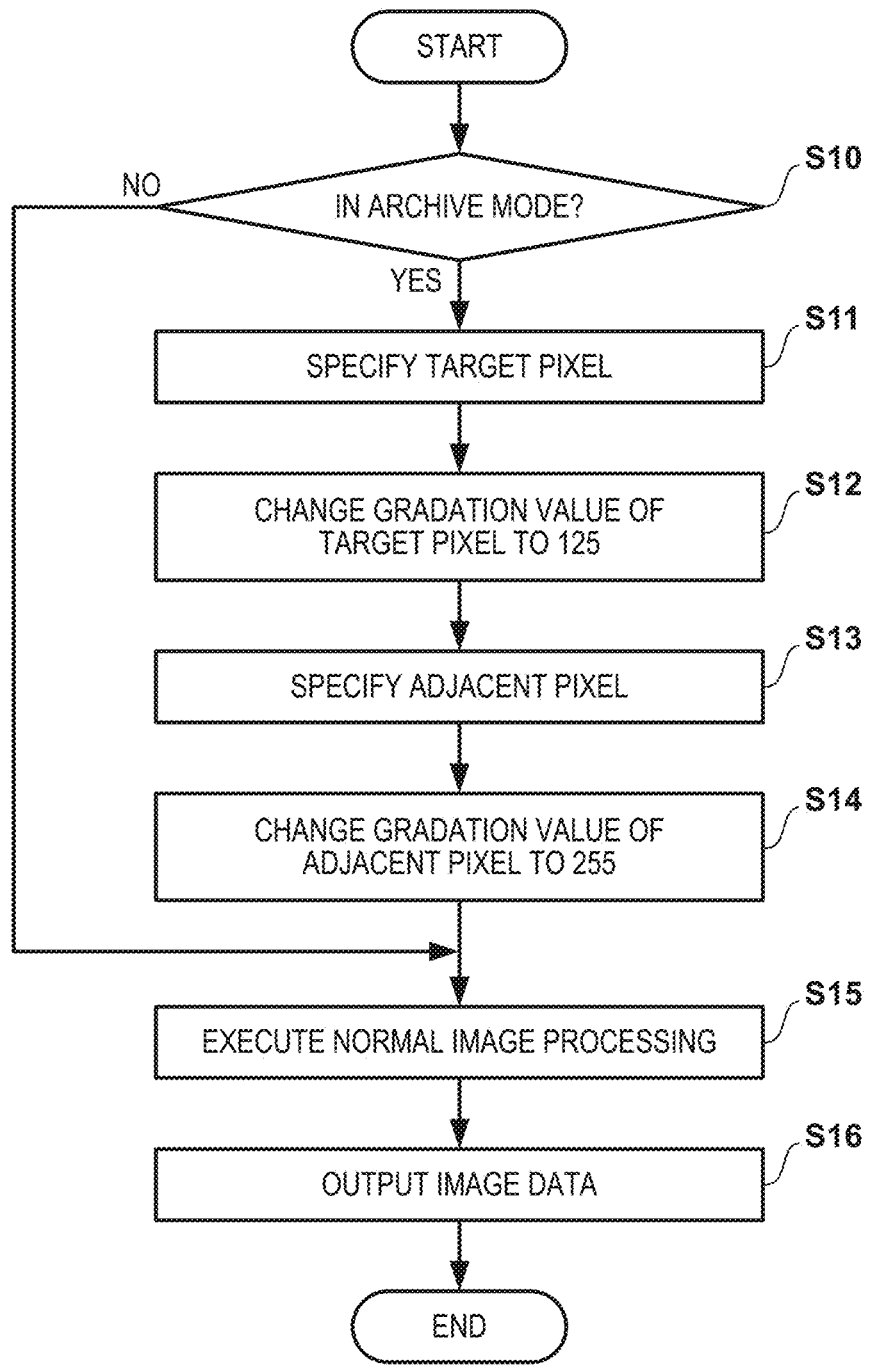
FIG. 4 is a flowchart of image processing according to an embodiment.

FIG. 4 is a flowchart illustrating image processing performed by the image processing unit 500 when forming an image. Here, starting image formation causes image data stored in the image memory 52 to be input to the image processing unit 500. In the following, the image data is assumed to be 8-bit bit map data. In other words, the image data includes coordinates of each pixel and a gradation value of each pixel indicated by 8 bits. Therefore, the gradation value takes a value from 0 to 255. In the present example, it is assumed that a gradation value of 0 indicates white, a gradation value of 255 indicates black, and gradation values of 1 to 254 indicate intermediate colors between white and black. Here, the higher the gradation value is, the higher the density of the intermediate color becomes. Additionally, in the following description, the conveyance direction of the sheet P is denoted as a sub-scanning direction, and the direction orthogonal to the sub-scanning direction in the surface of the sheet P is denoted as a main scanning direction.

At S10, the image processing unit 500 determines which of the archive mode or the normal mode is set. In a case when the normal mode is set, the image processing unit 500 executes normal image processing on the image data at S15. The normal image processing may be, for example, screen processing, smoothing processing, edge emphasis processing, or the like. Here, S15 may be skipped without performing image processing.

On the other hand, in a case when the archive mode is set, the image processing unit 500 specifies a target pixel at S11. In the present example, the target pixel is a pixel having a gradation value equal to or higher than a first threshold value. Here, in the present example, the first threshold value is assumed to be 235. At S12, the image processing unit 500 changes the gradation value of the target pixel to a first gradation value lower than the first threshold value. In the present example, the first gradation value is assumed to be 125.

Subsequently, the image processing unit 500 specifies an adjacent pixel at 513. The adjacent pixel is a pixel adjacent to a target pixel, among the pixels not selected as target pixels on the sheet P. Here, the adjacency direction may be either of the main scanning direction and the sub-scanning direction. At S14, the image processing unit 500 changes the gradation value of the adjacent pixel to a second gradation value higher than the first gradation value. In the present example, the second gradation value is assumed to be 255. Here, a condition may be provided for adjacent pixels such that the gradation value is equal to or lower than the second threshold value. In other words, a pixel adjacent to a target pixel and having a gradation value equal to or lower than the second threshold value may be selected as the adjacent pixel, among the pixels not selected as target pixels. The second threshold value may be set to a value lower than the first gradation value such as 0 or a value close to 0, for example.

After executing the processing at S14, the image processing unit 500 executes, at S15, normal image processing, similarly to the case when the normal mode is selected. However, in a case when the processing at S14 is executed, the processing at S16 may be executed, skipping processing at S15. By executing normal image processing, even when a graphic image part represented by intermediate gradation values mixes in the image to be formed, the graphic image part is performed with normal image processing. In either case, the image processing unit 500 outputs, at S16, the image data subjected to processing to the image forming unit 50.

Figure 5A:
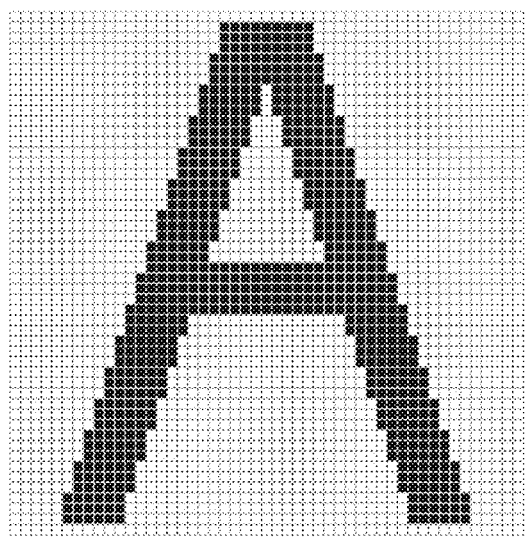
FIGS. 5A to 5C are explanatory diagrams of image processing according to an embodiment.
Figure 5B:
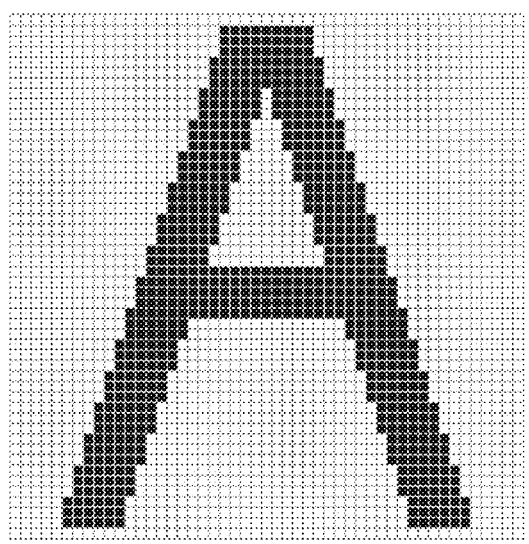
Figure 5C:
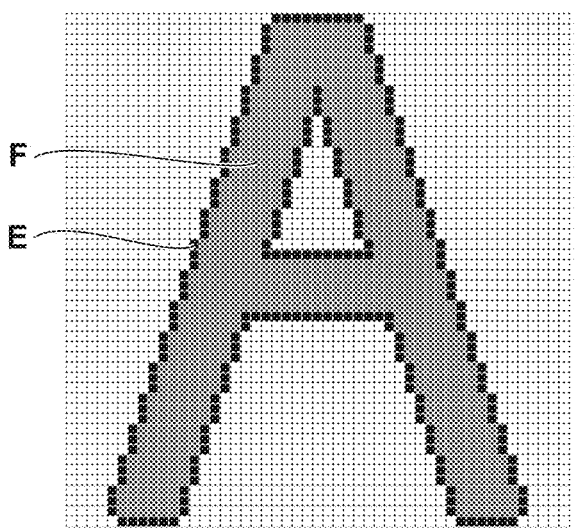

FIGS. 5A to 5C are explanatory diagrams of image processing in the image processing unit 500. In FIGS. 5A to 5C, each square having regular quadrangle shape indicates a pixel. FIG. 5A is a visual representation of gradation values of pixels of parts corresponding to a character "A", in a case of forming an image including a plurality of characters on the sheet P. Here, gradation values of pixels forming a character are larger than the first threshold value (235), whereas gradation values of other pixels are 0 (or a value close to 0). In other words, all the pixels illustrated in black color in FIG. 5A are target pixels. FIG. 5B is a visual representation of image data subjected to processing of the image data illustrated in FIG. 5A, in a case when the normal mode is used. Here, the color of each pixel corresponds to the gradation value. In other words, it is indicated that the darker the color of the pixel, the higher the gradation value. Here, FIG. 5B also illustrates an image actually formed in the part illustrated in FIG. 5A, in a case when the normal mode is used. As illustrated in FIG. 5B, an image corresponding to the original gradation values is formed in a case when the normal mode is used.

In contrast, FIG. 5C is a visual representation of image data subjected to processing on the image data illustrated in FIG. 5A, in a case when the archive mode is used. Here, FIG. 5C also illustrates an image actually formed in the part illustrated in FIG. 5A, in a case when the archive mode is used. As illustrated in FIG. 5C, the gradation value of target pixels F is changed to 125 at S12, exhibiting a lower density. In addition, the gradation value of adjacent pixels E adjacent to the target pixels F is changed to 255 at S14, exhibiting a higher density.

Figure 6A:
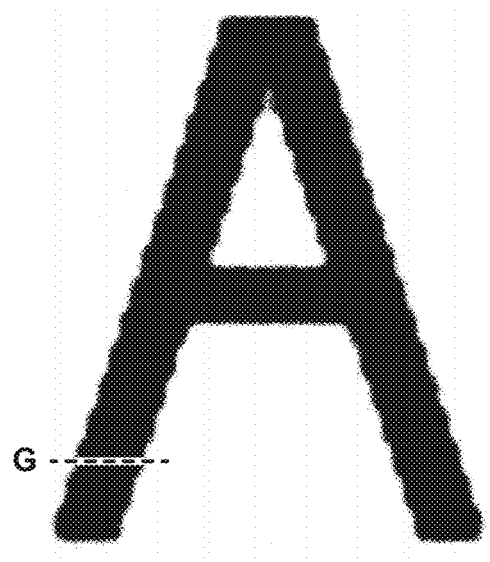
FIGS. 6A and 6B are diagrams explaining that adhering toner may differ due to difference in image processing.
Figure 6B:
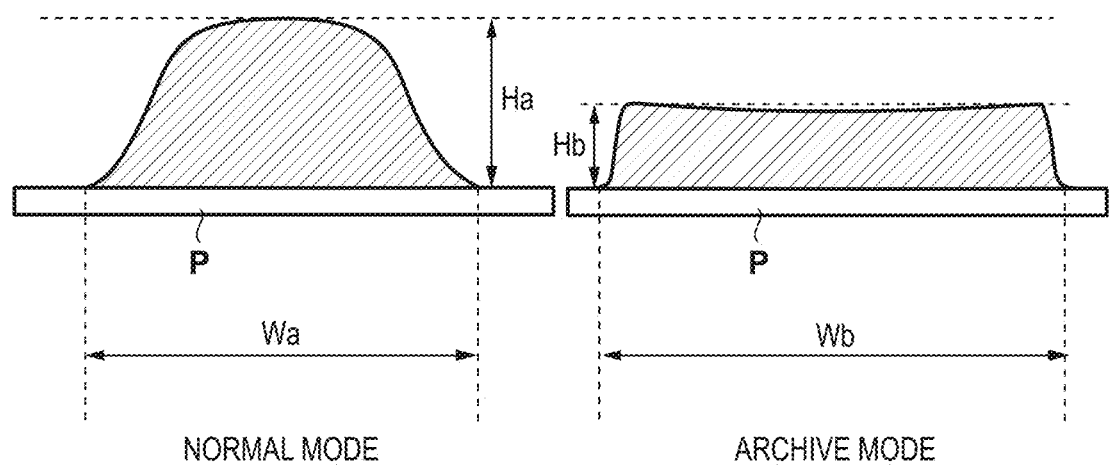

FIG. 6B illustrates a cross section of the sheet P taken along a line G illustrated in FIG. 6A, prior to fixing by the fixing apparatus 6. Here, the left side of FIG. 6B is a cross section for a case when an image is formed in the normal mode, and the right side is a cross section for a case when an image is formed in the archive mode. In the archive mode, the height of toner adhering to the sheet P becomes lower than in the normal mode, and the width of toner adhering to the sheet in the main scanning direction becomes wider. In other words, in equations Ha>Hb and Wa<Wb hold. Here, Ha and Wa are respectively the height and the width in the main scanning direction of toner adhering to the sheet P in a case when the normal mode is selected, and Hb and Wb are the width and the height in the main scanning direction of toner adhering to the sheet P in a case when the archive mode is selected. Here, in the archive mode, the reason why the width of toner in the main scanning direction widens than in the normal mode is because the gradation value of adjacent pixels is changed to 255, which is similar in the sub-scanning direction. Therefore, in the archive mode, the width of toner adhering to the sheet P also widens in the sub-scanning direction. Therefore, in the archive mode, the area of toner adhering to the sheet P becomes larger than in the normal mode. Here, although FIG. 6B illustrates toner before fixing, toner adheres in a similar manner after fixing.

Figure 7A:
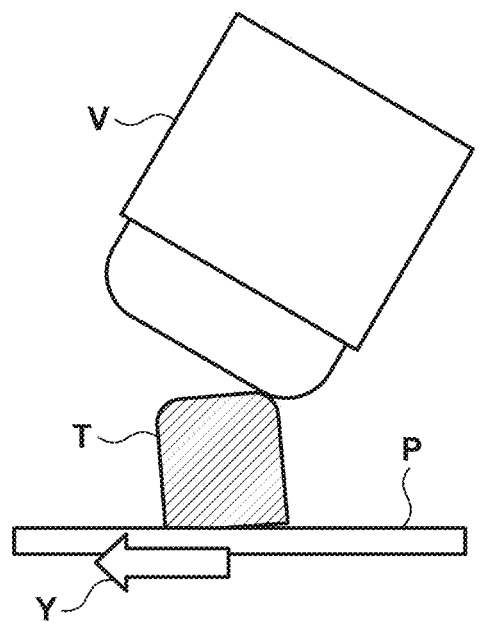
FIGS. 7A and 7B are diagrams explaining difference of proof stress against friction due to difference in adhering toner.
Figure 7B:
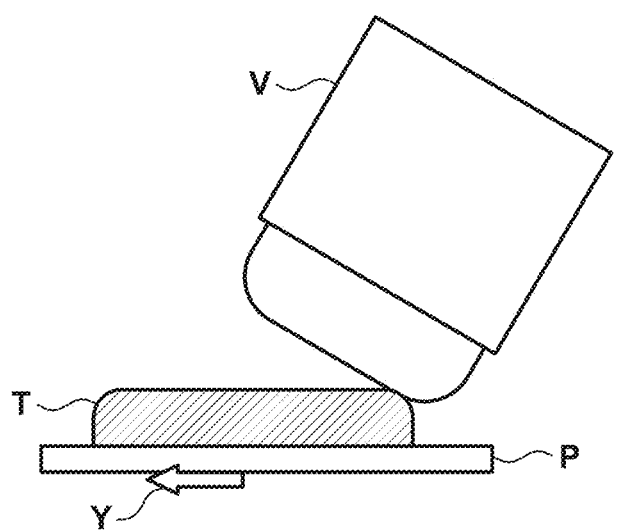

Subsequently, there will be described an effect on preservability (archivability) caused by a difference of the height and area of toner. FIGS. 7A and 7B illustrate a situation in which a friction force is applied to the toner by an eraser after the toner is fixed on the sheet P. Here, the toner in FIG. 7A is higher and smaller in area than the toner in FIG. 7B. In other words, FIG. 7A corresponds to toner of a product formed in the normal mode, and FIG. 7B corresponds to toner of a product formed in the archive mode. Upon an eraser V applying a frictional force to the surface of toner T, a shear stress Y is applied to the toner T, and an interface between the sheet P and the toner T.

The shear stress Y is proportional to the friction force and is inversely proportional to the area of the toner T. In other words, the shear stress Y in the case of FIG. 7B becomes smaller than that in FIG. 7A. The archive mode makes the area of the toner T larger than in the normal mode, and therefore the shear stress Y becomes smaller than the normal mode. Therefore, the archive mode makes the resistance stronger against the friction force than the normal mode. In addition, area of toner is larger in the archive mode than in the normal mode, and therefore allows for preventing a significant decrease of readability in comparison with the normal mode, even when a part of toner forming a character is lost due to the shear stress Y.

In addition, a low height of the toner T indicates that the amount of toner per unit area is small. Therefore, the lower the height of the toner T is, the smaller the heat capacity of the toner T becomes. As the heat capacity is smaller, the heat of the fixing apparatus 6 is transferred easier to the interface between the toner T and the sheet P, and thus the adhesion force of the toner T to the sheet P and toner binding force become higher. Therefore, the archive mode allows for enhancing the adhesion force of the toner T to the sheet P or the binding force between toner particles in comparison with the normal mode, thereby making the resistance against the friction force stronger than the normal mode.

In summary, the height of toner is set to be lower in the archive mode than in the normal mode, and the toner area (area of a region where toner continuously adheres) is set to be larger than in the normal mode. The aforementioned configuration allows for forming a product with a high resistance to wear. Therefore, use of the archive mode suppresses misrecognition of characters, and allows for forming a product with a high preservability (archivability) that can ensure readability.

In addition, as illustrated in FIG. 6B, the archive mode increases the uniformity of height of toner in comparison with the normal mode. In the following, explanation will be provided with regard to the reason of the foregoing discussion, and the effect on the preservability (archivability) caused by the uniformity of the height of toner.

Figure 8:
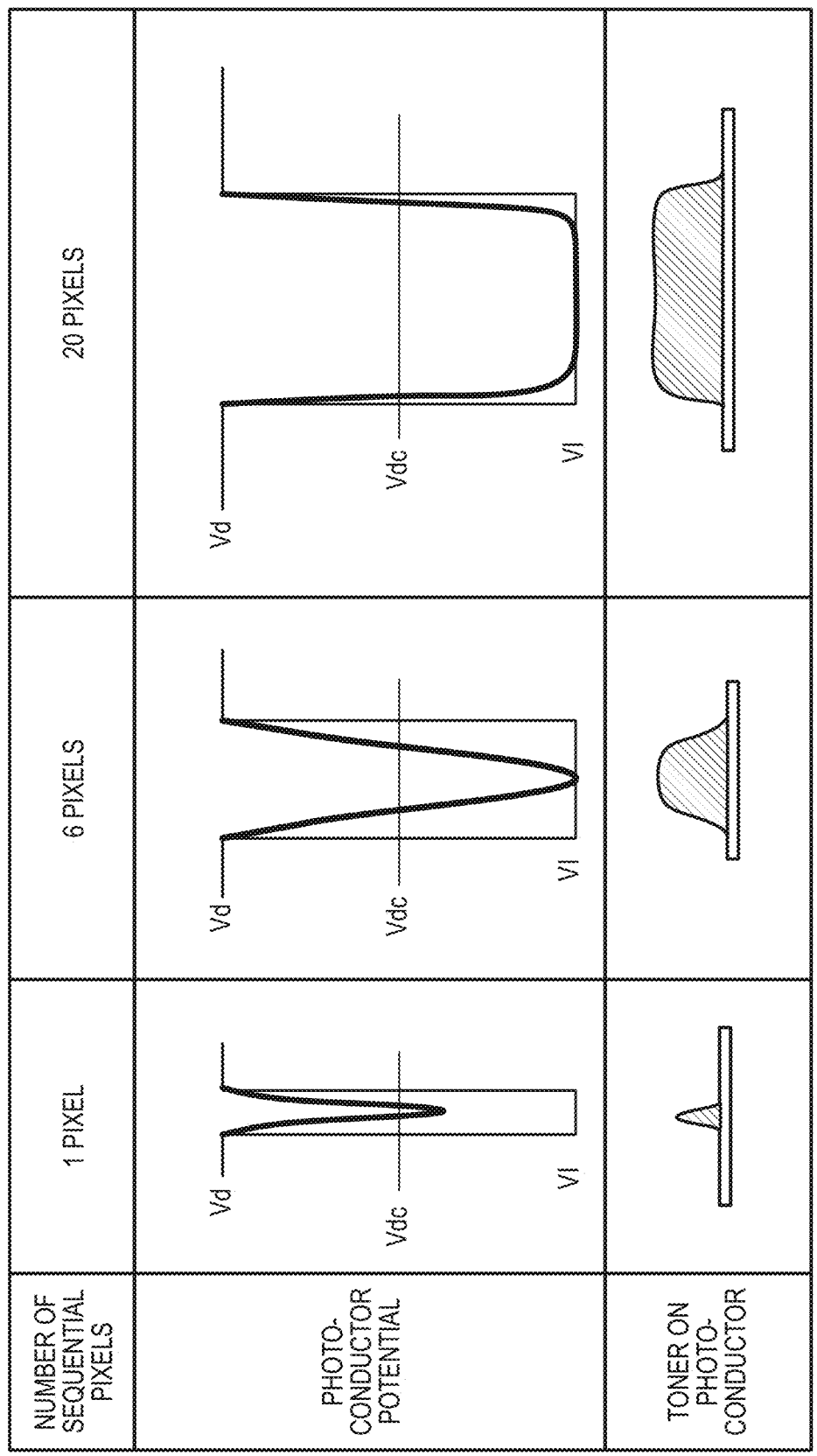
FIG. 8 is a diagram explaining that adhering toner may differ depending on the number of sequential pixels.

FIG. 8 illustrates an exposure potential (photoconductor potential) of the photoconductor 1 and toner adhering to the photoconductor 1 when exposing pixels with a gradation value of 255, for example. Here, the exposure potential of the photoconductor 1 refers to a potential of an exposed region exposed by the exposure apparatus 3 within the surface of the photoconductor 1, i.e., the potential of a region on which an electrostatic latent image is formed. Here, FIG. 8 illustrates exposure potentials and adhering toner, respectively, for sequential pixels having a gradation value of 255, in case of numbers of sequential pixels in the main scanning direction being 1, 6, and 20. In FIG. 8, Vd indicates a charging potential (potential of non-exposed regions of the photoconductor 1), Vdc indicates a developing potential (potential according to developing voltage), and Vl indicates a target potential of the exposed region.

An ideal exposure potential is expected to drop to a target potential Vl over the entire region of pixels. Toner adheres to a part of the surface of the photoconductor 1 on which the exposure potential is lower than the developing potential Vdc. In addition, the larger the difference between the exposure potential and the developing potential Vdc, the larger the amount of adhering toner (height of toner) becomes. Therefore, when the exposure potential drops to the target potential Vl over the entire region of the pixel, the toner adheres to the photoconductor 1 to a same height over the entire region of pixels. For example, as illustrated in FIG. 8, the exposure potential of the photoconductor 1 is approaching an ideal state, when the number of sequential pixels each having a gradation value of 255 in the main scanning direction is 20. However, the smaller the number of sequential pixels, the larger the deviation between the actual exposure potential and the ideal exposure potential becomes. For example, as illustrated in FIG. 8, when only one pixel has a gradation value of 255 and the other pixels have a gradation value of 0, the exposure potential of the pixel having a gradation value of 255 does not reach the target potential VI, only falling below the developing potential Vdc at the center of the pixel. This is because a light spot formed on the photoconductor 1 by the exposure apparatus 3 in order to expose the photoconductor 1 has a characteristics of the light intensity that is not uniform over the entire region of the light spot, and weakens from the center toward the edge of light spot. It can be seen from FIG. 8 that the uniformity of height of toner becomes lower for a smaller number of sequential pixels to which toner adheres, and that the toner adheres in a manner gradually increasing in height from the edge toward the center of the electrostatic latent image. It can also be seen that the smaller the number of sequential pixels to which toner adheres becomes, the narrower the width of adhering toner becomes than the ideal width.

For example, a character image or a line image includes small number of sequential pixels to which toner adheres in the main scanning direction or the sub-scanning direction, whereby the height of toner at the edge becomes lower than at the center, and thus uniformity of the height of toner becomes lower. In such a case, in the fixing apparatus 6, heating and pressurizing the edge of the toner image having a low height of toner is prevented by the center of the toner image having a high height of toner, and thus fixability to the edge is degraded. On the other hand, in a case of a high uniformity of height of toner, the entire region including the center and the edge of the toner image is sufficiently heated and pressurized in the fixing apparatus 6. Therefore, the higher the uniformity of height of toner, the higher the fixability of toner to the sheet P can be made. In addition, fixability of toner to the sheet P becomes uniform over the entire region of toner image, whereby loss due to wear can be suppressed.

The present embodiment sets gradation values of adjacent pixels to be larger than the corrected gradation value of the target pixel, in order to ensure uniformity of the height of toner. This is because the exposure potential at the edge of the electrostatic latent image tends to be higher than the potential at the center, as illustrated in FIG. 8. Increasing the gradation value of the edge of the electrostatic latent image allows for quickly reducing the exposure potential at the edge, thereby ensuring uniformity of the height of toner.

Note that, although the height of toner can be lowered by setting a smaller gradation value of the target pixel F, an excessively lowered height of toner may appear hollow. In addition, excessively lowering the height of toner may reduce the amount of toner weakening the binding force between the toner particles, thereby reducing the fixability of toner to the sheet P. Therefore, appropriate corrected gradation values of the target image F may vary depending on image forming conditions such as developing voltage, image line width, or the like. For example, about 30 to 70%, or 40 to 60% of the maximum gradation value may be set as the corrected gradation value for a toner image formed with a width of about six pixels such as the character "A" used for describing the present embodiment. The gradation value of the adjacent pixel E is adjusted so that the height of toner at the edge of toner image becomes substantially the same as at the center. Therefore, the gradation value of the adjacent pixel E is set to be higher than the corrected gradation value of the target pixel F such as between 50 and 100% of the maximum value, for example.

Here, it is assumed in the present embodiment that the target pixel F is a pixel having a gradation value equal to or higher than the first threshold value. However, setting all the pixels each having a gradation value equal to or higher than the first threshold value as target pixels and reducing their gradation values may fail in acquiring a desired image for a graphic image formed by dark gradation values.

Therefore, in a case when the numbers of sequential pixels, each having a gradation value equal to or higher than the first threshold value, in the main scanning direction and the sub-scanning direction are both equal to or larger than a predetermined value, the sequential pixels may be excluded from target pixels. In other words, target pixels may be defined as a pixel having a gradation value equal to or higher than the first threshold value, and also sequentially arranged in a smaller number than a predetermined number (second sequential number) in at least one of the main scanning direction and the sub-scanning direction. Such a solid image with a large number of sequential pixels has a high uniformity of toner as well as a large area, as described referring to FIG. 8, and therefore has a sufficiently high resistance for friction. In addition, unlike character images or line images, the solid images also have a high resistance to image loss and therefore exclusion thereof from target pixels causes little problem.

Additionally, in a case when type information indicating the type of image is included in the input image data, the type information can be used for determining target pixels. Specifically, in a case when the image data indicates a photographic image, a graphic image, a line image, and a character image, the pixels each having a gradation value equal to or higher than the first threshold value included in the line image and the character image can be selected as target pixels.

In summary, selecting the archive mode causes performing of image processing that increases the toner area and lowers the height of toner, in comparison with the normal mode. Increasing the area of toner can reduce the shear stress Y applied to the toner and also the interface between the sheet P and the toner, and suppress occurrence of image loss due to a frictional force. In addition, lowering the height of toner allows for sufficiently heating the toner in the fixing apparatus 6, and enhancing the adhesion force of toner to the sheet and the binding force between toner particles, thereby suppressing occurrence of image loss due to frictional force. Furthermore, increasing the uniformity of height of toner allows for heating the entire region of toner uniformly, and enhancing the adhesion force of toner to the sheet and the binding force between toner particles, thereby suppressing occurrence of image loss due to frictional force. According to the aforementioned configuration, it is possible to form a highly preservable product.

Second Embodiment

Subsequently, a second embodiment will be explained, focusing on the difference from the first embodiment. In the first embodiment, selecting the archive mode provides an increased toner area, a lowered height of toner, and an increased uniformity of height of toner, in comparison with the normal mode. The present embodiment realizes a similar effect to the first embodiment by adjusting the charging voltage or the developing voltage.

Figure 9:
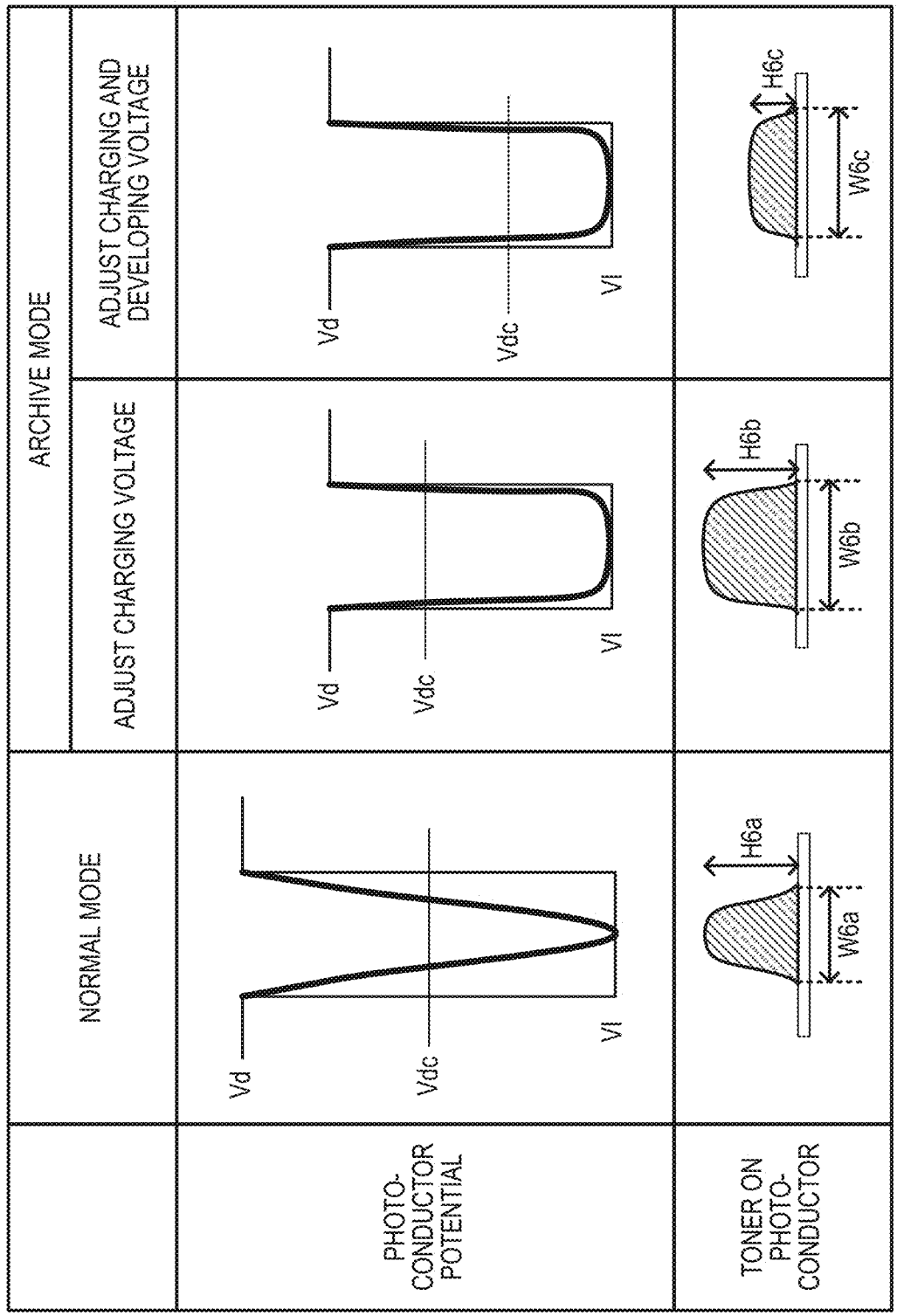
FIG. 9 is a diagram explaining that adhering toner may differ due to charging voltage and developing voltage.

FIG. 9 illustrates an exposure potential of the photoconductor 1 and toner adhering to the photoconductor 1, in a case when six sequential pixels in the main scanning direction, each having a gradation value of 255 are exposed. The left side of FIG. 9 indicates the normal mode. In the normal mode, the maximum value of height of toner is H6a, and the width of toner in the main scanning direction is W6a. Note that, in the normal mode, the height of toner adhering to the photoconductor 1 at the edge in the main scanning direction is lower than the center. The center of FIG. 9 illustrates a case when the absolute value of the charging voltage is set to be lower in the archive mode than in the normal mode. Lowering the charging voltage causes the charging potential Vd of the photoconductor 1 to decrease as well. Lowering the charging potential Vd makes the exposure potential easier to decrease. On the photoconductor 1, toner adheres to a region where the exposure potential is lower than the developing potential Vdc, and therefore the width of toner in the main scanning direction becomes W6b, which is larger than W6a of the normal mode. Here, although the height of toner H6b is substantially the same as H6a, which is the maximum value in the normal mode, by adjusting the charging potential Vd, uniformity of height of toner becomes higher than in the normal mode.

The right side of FIG. 9 illustrates a case when the absolute value of the developing voltage is also set lower than in the normal mode, in addition to adjusting the charging voltage at the center of FIG. 9. Setting the absolute value of the developing voltage to be lower than in the normal mode causes the developing potential Vdc to decrease. The height of toner adhering to the photoconductor 1 decreases as the difference between the developing potential Vdc and the exposure potential becomes smaller, and therefore the height of toner H6c can be made lower than the height of toner H6a in the normal mode.

In summary, adjusting both the exposure voltage and the developing voltage in the archive mode allows for increasing the toner area, lowering the height of toner, and increasing the uniformity of height of toner, in comparison with the normal mode. Here, as illustrated in FIG. 9, although adjusting only the exposure voltage can make the toner area larger and also the uniformity of height of toner higher than in the normal mode, the height of toner cannot be lowered. However, making the toner area larger and the uniformity of height of toner higher than in the normal mode allows for making the preservability of the product higher than in the normal mode. Adjusting only the developing voltage can lower the height of toner, and therefore make the preservability of the product higher than in the normal mode. Here, in the present embodiment, the image processing unit 500 executes only the normal image processing.

Subsequently, effects of the first and the second embodiments will be described. FIG. 10 illustrates a result of wear test. The wear test was performed in a manner forming an image containing the character "A", reciprocally moving an eraser 100 times at a speed of 1 back and forth per second in a 50 mm zone including the part of the character "A" in the product while pressing the eraser with a predetermined force, and subsequently determining a state of the character "A" in the product. Here, the test was performed on a product formed in the archive mode of the first embodiment, a product formed in the archive mode of the second embodiment, and a product formed in the normal mode. Here, only the developing voltage was adjusted in the archive mode of the second embodiment.

Figure 11A:
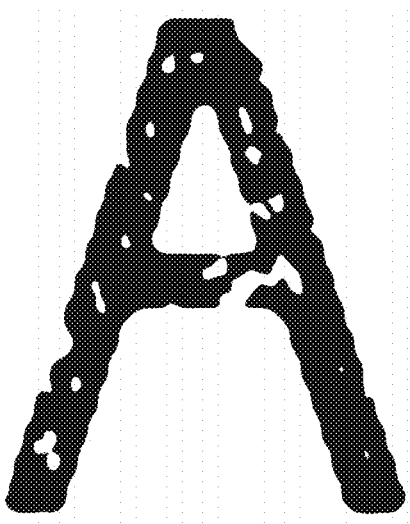
FIGS. 11A to 11C are explanatory diagrams of effects of embodiments.
Figure 11B:
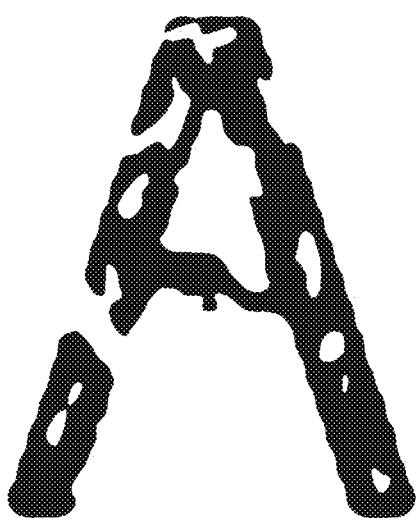
Figure 11C:

In the wear test result of FIG. 10, the degree of readability of the character "A" is indicated as "Good", "Marginal", "Poor". Specifically, "Good" indicates a state in which readability is ensured, "Poor" indicates a state with no readability, and "Marginal" indicates a state with degraded readability although it is readable. FIG. 11A illustrates an example of a result of "Good", FIG. 11B illustrates an example of a result of "Marginal", and FIG. 11C illustrates an example of a result of "Poor". As illustrated in FIG. 10 and FIGS. 11A to 11C, both the first and the second embodiments indicate better results than in the normal mode, providing a product with a strong resistance to wear and a high preservability.

Third Embodiment

Subsequently, a third embodiment will be described, focusing on the difference from the first embodiment. Character images and line images may be formed of lines of various thicknesses. FIG. 12 is a visual representation of gradation values of image data for respective pixels forming a character "3". Here, each square having regular quadrangle shape indicates a pixel, gradation values of pixels forming the character are larger than the first threshold value (235), and gradation values of other pixels are 0 (or a value close to 0). A reference symbol J in FIG. 12 indicates a part formed of line widths of one to three pixels in the character "3". As has been described referring to FIG. 8, the width and the height of adhering toner decrease as the line becomes thinner. For example, the character "A" used for describing the first embodiment is formed of lines having a width of about six pixels. However, lowering the gradation value of the target pixels of extremely thin lines formed of one to three pixels in a similar manner to the first embodiment may lead to an excessively low height of toner, thereby failing in improving the fixability of toner to the sheet P.

Therefore, the present embodiment classifies a target pixel as a first target pixel or a second target pixel, and corrects the gradation value of the first target pixel similarly to the first embodiment, but does not correct the gradation value of the second target pixel. Here, second target pixels are pixels satisfying a predetermined criterion among target pixels, and first target pixels are pixels other than second target pixels among target pixels. In the following example, pixels forming an edge among target pixels are assumed to satisfy a predetermined criterion. In other words, edge pixels among target pixels are classified as the second target pixels.

Figure 13:
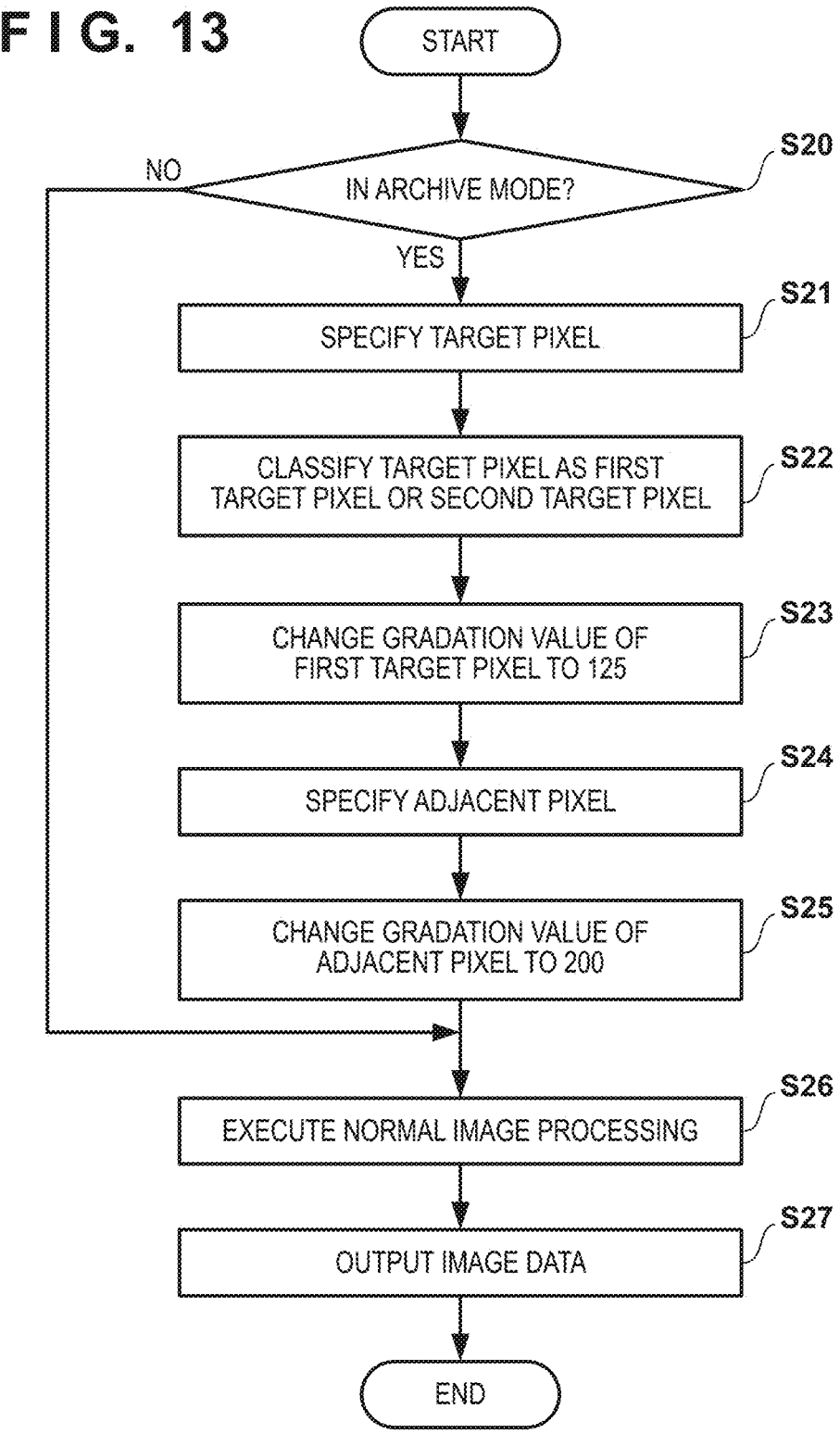
FIG. 13 is a flowchart of image processing according to an embodiment.

FIG. 13 is a flowchart illustrating image processing according to the present embodiment. At S20, the image processing unit 500 determines which of the archive mode or the normal mode is set. In a case when the normal mode is set, the image processing unit 500 executes normal image processing on the image data at S26, similarly to the first embodiment. On the other hand, in a case when the archive mode is set, the image processing unit 500 specifies a target pixel at S21. Similarly to the first embodiment, the target pixel is a pixel having a gradation value equal to or higher than the first threshold value. Here, in the present example, the first threshold value is assumed to be 235.

The image processing unit 500 classifies a target pixel in a first target pixel and a second target pixel (excluded pixel) at S22. In the present example, second target pixels are pixels forming an edge among target pixels. In other words, second target pixels in the present example are pixels adjacent to adjacent pixels among target pixels. Here, a target pixel of at least one of four pixels adjacent in the main scanning direction and the sub-scanning direction having a gradation value equal to or lower than a third threshold value may be defined as a second target pixel. Here, the third threshold value may be set to a value lower than the first gradation value such as 0 or a value close to 0, for example.

First target pixels are pixels other than second target pixels among target pixels. At S23, the image processing unit 500 changes the gradation value of the first target pixel to a first gradation value lower than the first threshold value. In the present example, the first gradation value is assumed to be 125. On the other hand, the gradation value of the second target pixel is not changed in the present embodiment, and therefore is the same gradation value as in the normal mode.

Subsequently, at S24, the image processing unit 500 specifies an adjacent pixel. The adjacent pixel is a pixel adjacent to a target pixel, among the pixels not selected as target pixels on the sheet P. Here, the adjacency direction may be either of the main scanning direction and the sub-scanning direction. At S25, the image processing unit 500 changes the gradation value of the adjacent pixel to a second gradation value higher than the first gradation value. In the present example, the second gradation value is assumed to be 200. Here, a condition may be provided for adjacent pixels such that the gradation value is equal to or lower than the second threshold value. In other words, a pixel adjacent to a target pixel and having a gradation value equal to or lower than the second threshold value may be selected as the adjacent pixel, among the pixels not selected as target pixels. The second threshold value may be less than the first threshold value, e.g., a value close to zero, or zero. Here, the third threshold value may be set to the same value as the second threshold value.

Subsequent to executing the processing at S25, the image processing unit 500 executes normal image processing at S26, similarly to the case when the normal mode is selected. However, in a case when the processing at S25 is executed, the processing at S27 may be executed, skipping the processing at S26. By executing normal image processing, even when a graphic image part represented by intermediate gradation values mixes in the image to be formed, the graphic image part is performed with normal image processing. In either case, the image processing unit 500 outputs, at S27, the image data subjected to processing to the image forming unit 50.

Figure 14:
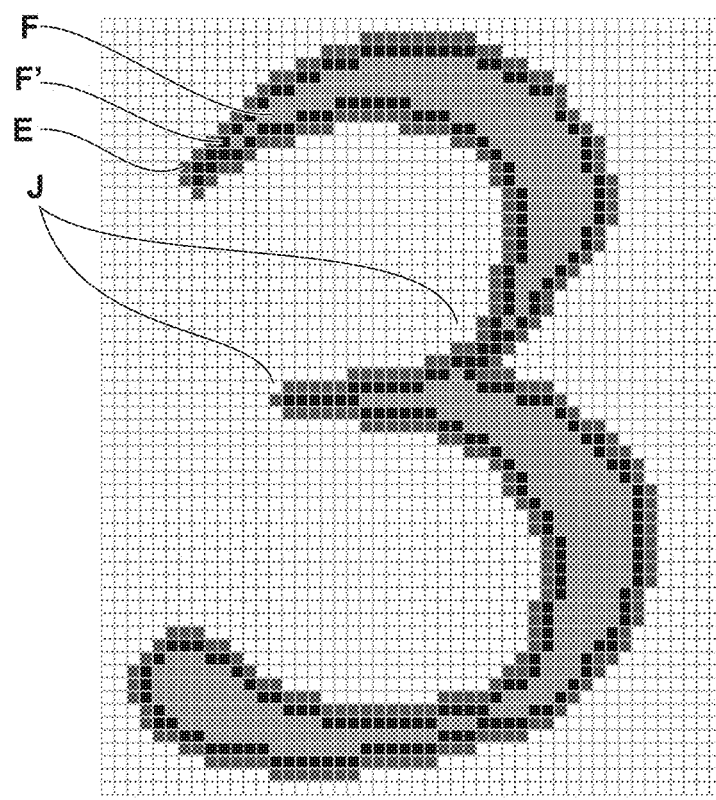
FIG. 14 is an explanatory diagram of image processing according to an embodiment.

FIG. 14 is a visual representation of image data subjected to processing on the image data illustrated in FIG. 12 output from the image processing unit 500, in a case when the archive mode is selected. The reference symbol F indicates the first target pixel, with the gradation value changed from 255 to 125. The reference symbol F' indicates the second target pixel, with the gradation value kept to 255. The reference symbol E indicates the adjacent pixel, with the gradation value changed from 0 to 200. While the gradation values of pixels forming the thin line portion indicated by the reference symbol J are maintained, the gradation values of adjacent pixels around the thin line portion are increased.

Figure 15A:
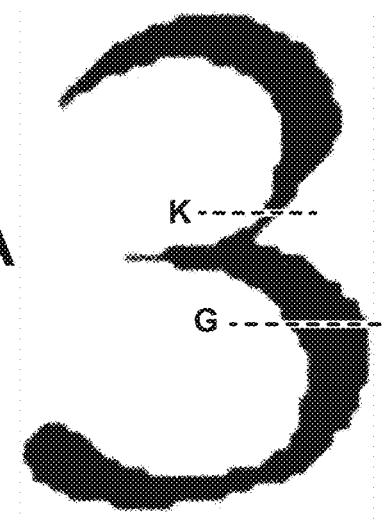
FIGS. 15A to 15C are diagrams explaining that adhering toner may differ due to difference in image processing.
Figure 15B:
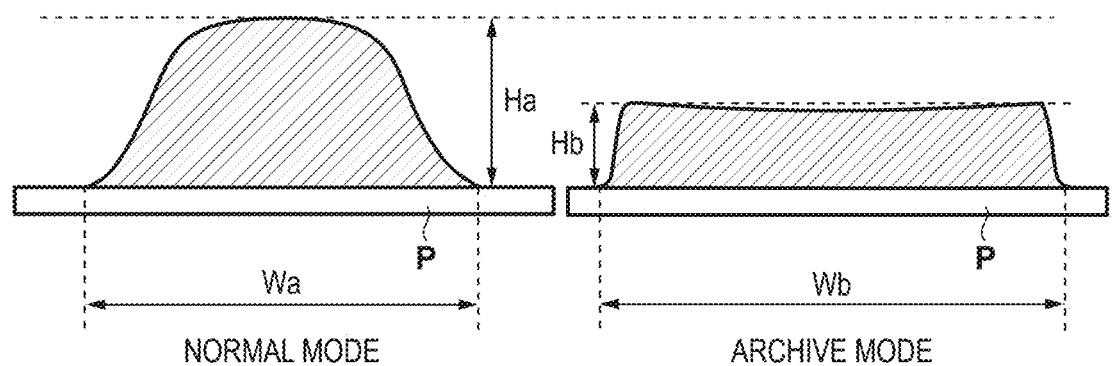

FIG. 15B illustrates a cross-section of the sheet P taken along a line G illustrated in FIG. 15A, prior to fixing by the fixing apparatus 6. Here, the left side of FIG. 15B illustrates a cross section of a case when image forming is performed in the normal mode, and the right side illustrates a cross section of a case when image forming is performed in the archive mode. Similarly to the first embodiment, the height of toner adhering to the sheet P becomes lower, and the width of toner adhering to the sheet P in the main scanning direction becomes wider in the archive mode than in the normal mode. In other words, in equations Ha>Hb and Wa<Wb hold. Here, Ha and Wa are respectively the height and the width in the main scanning direction of toner adhering to the sheet P in a case where the normal mode is selected, and Hb and Wb are the width and the height in the main scanning direction of toner adhering to the sheet P in a case where the archive mode is selected.

Figure 15C:
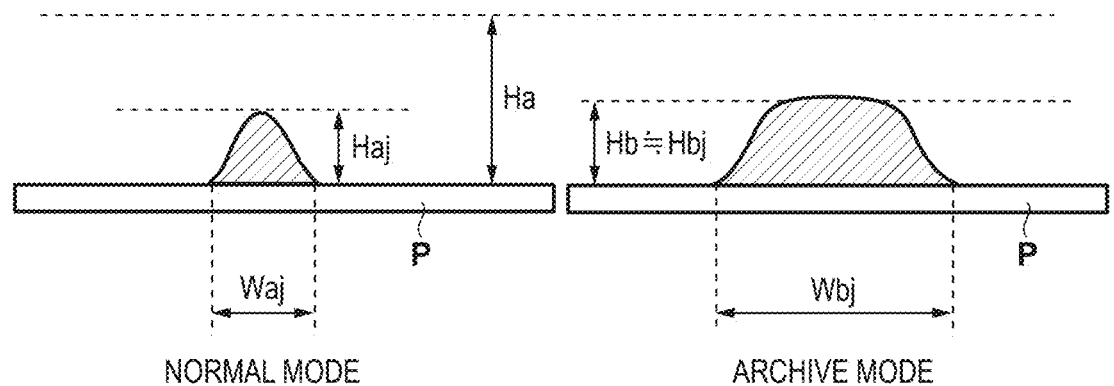

FIG. 15C illustrates a cross section of the sheet P taken along a line K illustrated in FIG. 15A, prior to fixing by the fixing apparatus 6. Here, the left side of FIG. 15C is a cross-section of a case when image forming is performed in the normal mode, and the right side is a cross section of a case when image forming is performed in the archive mode. The width Wbj of toner adhering to the sheet P in the archive mode becomes larger than the width Waj of toner adhering to the sheet P in the normal mode. On the other hand, the height Hbj of toner adhering to the sheet P in the archive mode becomes slightly larger than the height Haj of toner adhering to the sheet P in the normal mode.

However, comparison of the height Ha at the position of the line G of toner adhering to the sheet P with the height Haj at the position of the line K in the normal mode indicates that Haj is significantly lower than Ha. On the other hand, the height Hb at the position of the line G of toner adhering to the sheet P is substantially equal to the height Hbj at the position of the line K in the archive mode. In other words, the archive mode allows for increasing the uniformity of height of toner than the normal mode. Additionally, although the height of toner in some parts becomes slightly higher than the height of toner in the normal mode, it is possible to make the height of toner in other parts lower than in the normal mode. Therefore, the archive mode allows for increasing the fixability of toner to the sheet P.

In summary, the present invention allows for ensuring the fixability of toner to the sheet P and forming a highly preservable product, even when an image part formed of extremely thin lines is included.

Note that, in the present embodiment, the predetermined criterion for determining pixels to be second target pixels is that for determining the pixels at an edge among target pixels. However, it is also possible to classify pixels forming a thin line as second target pixels among target pixels, instead of pixels forming an edge. Specifically, the width, in other words, the number of sequential pixels in the main scanning direction and the sub-scanning direction of a line formed of target pixels are determined based on the image data. When the number of sequential pixels in at least one of the main scanning direction and the sub-scanning direction is smaller than a predetermined number (first sequential number) such as four or five pixels, the pixels forming the line can be classified as second target pixels. It has been stated that, in the first embodiment, pixels each having a gradation value equal to or higher than the first threshold value, and also sequentially arranged in a smaller number than a predetermined number (second sequential number) in at least one of the main scanning direction and the sub-scanning direction target pixels are defined as target pixels. Here, the second sequential number is assumed to be larger than the first sequential number.

<Additional Notes>

When the archive mode is selected, each of the aforementioned embodiments may be configured so as to increase the fixing temperature of the fixing apparatus 6, or reduce the processing speed of image forming, i.e., the conveyance speed of the sheet P. Increasing the fixing temperature or reducing the processing speed allows for sufficiently heating the toner, thereby increasing the fixability of toner to the sheet P. Additionally, when the archive mode is selected, the developing voltage and/or the charging voltage may be set lower than the normal mode as has been described in the second embodiment, in addition to performing the image processing described in the first and the third embodiments.

In addition, the present invention can be realized as an image processing apparatus configured to perform the image processing described in the first and the third embodiments. The image processing apparatus transmits, to the image forming apparatus, the image data subjected to image processing, and causes the image forming apparatus to form an image.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
    a setting unit configured to set an operation mode among a plurality of operation modes including a first mode and a second mode; and
    an image forming unit configured to form an image on a sheet by adhering toner on the sheet based on image data, in accordance with the operation mode set by the setting unit,
    wherein an area of toner adhered to the sheet based on the image data in a case when the first mode is set is larger than an area of toner adhered to the sheet based on the image data in a case when the second mode is set, or a height of toner adhered to the sheet based on the image data in the case when the first mode is set is lower than a height of toner adhered to the sheet based on the image data in the case when the second mode is set.

2. The image forming apparatus according to claim 1, wherein
    the image forming unit includes a photoconductor, a charging unit configured to output a charging voltage to charge the photoconductor, an exposure unit configured to expose the charged photoconductor to form an electrostatic latent image, and a developing unit configured to output a developing voltage to adhere toner to the electrostatic latent image, and
    the image forming unit, in the case when the first mode is set, reduces an absolute value of the developing voltage to be lower than in the case when the second mode is set, thereby reducing the height of toner adhered to the sheet based on the image data in the case when the first mode is set to be lower than the height of toner adhered to the sheet based on the image data in the case when the second mode is set.

3. The image forming apparatus according to claim 1, wherein
    the image forming unit includes a photoconductor, a charging unit configured to output a charging voltage to charge the photoconductor, an exposure unit configured to expose the charged photoconductor to form an electrostatic latent image, and a developing unit configured to output a developing voltage to adhere toner to the electrostatic latent image, and
    the image forming unit, in the case when the first mode is set, reduces an absolute value of the charging voltage to be lower than in the case when the second mode is set, thereby increases the area of toner adhered to the sheet based on the image data in the case when the first mode is set to be larger than the area of toner adhered to the sheet based on the image data in the case when the second mode is set.

4. The image forming apparatus according to claim 1, wherein
    the image forming unit includes a photoconductor, a charging unit configured to output a charging voltage to charge the photoconductor, an exposure unit configured to expose the charged photoconductor to form an electrostatic latent image, and a developing unit configured to output a developing voltage to adhere toner to the electrostatic latent image, and
    the image forming unit, in the case when the first mode is set, reduces absolute values of the charging voltage and the developing voltage to be lower than in the case when the second mode is set, thereby increases the area of toner adhered to the sheet based on the image data in the case where the first mode is set to be larger than the area of toner adhered to the sheet based on the image data in the case when the second mode is set, and reduces the height of toner adhered to the sheet based on the image data in the case when the first mode is set to be lower than the height of toner adhered to the sheet based on the image data in the case when the second mode is set.

5. An image forming apparatus comprising:
    a setting unit configured to set an operation mode among a plurality of operation modes;
    a processing unit configured to perform image processing on image data according to the operation mode set by the setting unit; and
    an image forming unit configured to form, based on the image data subjected to the image processing by the processing unit, an image on a sheet being conveyed in a conveyance direction,
    wherein, in a case when a first mode among the plurality of operation modes is set, the image processing by the processing unit includes determining, in the image data, one or more target pixels having a gradation value equal to or higher than a first threshold value, and one or more adjacent pixels that are different from the one or more target pixels and adjacent to the one or more target pixels, setting a first gradation value lower than the first threshold value as a gradation value of the one or more target pixels, and setting a second gradation value higher than the first gradation value as a gradation value of the one or more adjacent pixels.

6. The image forming apparatus according to claim 5, wherein, in a case when the first mode among the plurality of operation modes is set, the image processing by the processing unit includes determining one or more excluded pixels satisfying a predetermined criterion among the one or more target pixels, setting a first gradation value lower than the first threshold value as a gradation value of one or more pixels among the one or more target pixels other than the one or more excluded pixels, and setting a second gradation value higher than the first gradation value as a gradation value of the one or more adjacent pixels.

7. The image forming apparatus according to claim 6, wherein, in the case when the first mode is set, the gradation value of the one or more excluded pixels is not changed in the image processing by the processing unit.

8. The image forming apparatus according to claim 6, wherein the one or more excluded pixels are the one or more target pixels adjacent to the one or more adjacent pixels.

9. The image forming apparatus according to claim 6, wherein the one or more excluded pixels are the one or more target pixels sequentially arranged in a smaller number than a first predetermined number in at least one of the conveyance direction and a direction orthogonal to the conveyance direction.

10. The image forming apparatus according to claim 5, wherein the one or more target pixels are pixels sequentially arranged in a smaller number than a second predetermined number in at least one of the conveyance direction and a direction orthogonal to the conveyance direction, among pixels having a gradation value equal to or higher than the first threshold value.

11. The image forming apparatus according to claim 5, wherein the one or more target pixels are pixels forming a character image or a line image having a gradation value equal to or higher than the first threshold value.

12. The image forming apparatus according to claim 5, wherein the one or more adjacent pixels are one or more pixels that are different from the one or more target pixels and adjacent to the one or more target pixels, and have a gradation value equal to or lower than a second threshold value.

13. The image forming apparatus according to claim 12, wherein the second threshold value is lower than the first gradation value.

14. The image forming apparatus according to claim 5, wherein the image forming unit includes a fixing unit configured to heat the sheet to fix toner to the sheet and, when the first mode is set, increases temperature of the fixing unit to be higher, or reduces conveyance speed of the sheet to be lower, than in the case when the first mode is not set.

15. An image forming apparatus comprising:
a setting unit configured to set an operation mode among a plurality of operation modes including a first mode and a second mode;
a processing unit configured to perform image processing on first image data according to the operation mode set by the setting unit; and
an image forming unit configured to form, based on second image data subjected to the image processing by the processing unit, an image on a sheet being conveyed in a conveyance direction,
wherein, when, in the second image data in a case when the second mode is set, one or more pixels having a gradation value equal to or higher than a first threshold value are specified as one or more target pixels and one or more pixels that are different from the one or more target pixels and adjacent to the one or more target pixels are specified as one or more adjacent pixels, in the second image data in a case when the first mode is set, the gradation value of the one or more target pixels are a first gradation value lower than the first threshold value, and the gradation value of the one or more adjacent pixels are a second gradation value higher than the first gradation value.

16. The image forming apparatus according to claim 15, wherein, when, in the second image data in a case when the second mode is set, one or more pixels having a gradation value equal to or higher than a first threshold value is specified as one or more target pixels, one or more pixels that are different from the one or more target pixels and adjacent to the one or more target pixels are specified as one or more adjacent pixels, and one or more pixels satisfying a predetermined criterion among the one or more target pixels are specified as one or more excluded pixels, in the second image data in a case when the first mode is set, a gradation value of one or more pixels among the one or more target pixels other than the one or more excluded pixels are a first gradation value lower than the first threshold value, and the gradation value of the one or more adjacent pixels are a second gradation value higher than the first gradation value.

17. The image forming apparatus according to claim 16, wherein, in the second image data, in a case when the first mode is set, the gradation value of the one or more excluded pixels are the same as the gradation value of the one or more excluded pixels in the second image data in a case when the second mode is set.

18. An image processing apparatus comprising:
a setting unit configured to set an operation mode among a plurality of operation modes;
a processing unit configured to perform image processing on image data according to the operation mode set by the setting unit,
wherein, in a case when a first mode among the plurality of operation modes is set, the image processing by the processing unit includes determining, in the image data, one or more target pixels having a gradation value equal to or higher than a first threshold value, and one or more adjacent pixels that are different from the one or more target pixels and adjacent to the one or more target pixels, setting a first gradation value lower than the first threshold value as a gradation value of the one or more target pixels, and setting a second gradation value higher than the first gradation value as a gradation value of the one or more adjacent pixels.

19. The image processing apparatus according to claim 18, wherein, in a case when the first mode among the plurality of operation modes is set, the image processing by the processing unit includes determining one or more excluded pixels satisfying a predetermined criterion among the one or more target pixels, setting a first gradation value lower than the first threshold value as a gradation value of one or more pixels among the one or more target pixels other than the one or more excluded pixels, and setting a second gradation value higher than the first gradation value as a gradation value of the one or more adjacent pixels.

* * * * *